United States Patent
Ye (10) Patent No.: US 10,439,766 B2
(45) Date of Patent: Oct. 8, 2019

(54) METHOD AND APPARATUS FOR TRANSMITTING DUPLICATION DATA USING MULTIPLE CARRIERS

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/871,114

(22) Filed: Jan. 15, 2018

(65) Prior Publication Data

US 2018/0270021 A1  Sep. 20, 2018

Related U.S. Application Data

(60) Provisional application No. 62/471,935, filed on Mar. 15, 2017.

(51) Int. Cl.
| | |
|---|---|
| *H04L 1/18* | (2006.01) |
| *H04L 1/08* | (2006.01) |
| *H04L 5/00* | (2006.01) |
| *H04B 7/06* | (2006.01) |
| *H04B 7/12* | (2006.01) |
| *H04W 72/04* | (2009.01) |
| *H04W 72/12* | (2009.01) |

(52) U.S. Cl.
CPC .......... *H04L 1/1819* (2013.01); *H04B 7/0613* (2013.01); *H04B 7/12* (2013.01); *H04L 1/08* (2013.01); *H04L 1/189* (2013.01); *H04L 5/001* (2013.01); *H04L 5/0044* (2013.01); *H04W 72/0446* (2013.01); *H04W 72/1268* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 9,258,755 | B1* | 2/2016 | Ramamurthy | H04W 36/14 |
| 10,142,799 | B2* | 11/2018 | Horn | H04W 80/02 |
| 2007/0299973 | A1* | 12/2007 | Borgendale | G06F 9/546 |
| | | | | 709/227 |
| 2012/0057560 | A1* | 3/2012 | Park | H04L 1/08 |
| | | | | 370/329 |
| 2016/0255619 | A1* | 9/2016 | Yi | H04W 24/08 |
| | | | | 370/252 |
| 2016/0302075 | A1* | 10/2016 | Dudda | H04W 12/10 |

OTHER PUBLICATIONS

Search Report dated Jul. 13, 2018 for EP application No. 18152897.7, pp. 1-6.

(Continued)

*Primary Examiner* — Lonnie V Sweet
(74) *Attorney, Agent, or Firm* — Winston Hsu (57) ABSTRACT

A method for a use equipment to transmit duplication data using multiple carriers includes: configured by a base station to associate a first radio bearer to at least a first logical channel and a second logical channel; associating the first logical channel to at least one first carrier; associating the second logical channel to at least one second carrier that is different from the first carrier; and transmitting a first data associated with the first radio bearer via the first logical channel and a duplicate of the first data via the second logical channel.

8 Claims, 5 Drawing Sheets

(56) References Cited

OTHER PUBLICATIONS

LG Electronics Inc., "Packet duplication in CA", 3GPP TSG-RAN WG2 Meeting #97, R2-1701542, Feb. 13-17, 2017, Athens, Greece, XP051212166, pp. 1-3.
Intel Corporation, "Packet duplication for URLLC within a gNB", 3GPP TSG-RAN WG2 97 meeting, R2-1701720, Feb. 13-17, 2017, Athens, Greece, XP051212293, pp. 1-3.
3GPP TSG-RAN WG2 Meeting #98, May 15, 2017.

* cited by examiner

METHOD AND APPARATUS FOR TRANSMITTING DUPLICATION DATA USING MULTIPLE CARRIERS

CROSS REFERENCE TO RELATED APPLICATIONS

This application claims the benefit of U.S. Provisional Application No. 62/471,935, filed on Mar. 15, 2017. The entire contents of the related applications are incorporated herein by reference.

BACKGROUND OF THE INVENTION

1. Field of the Invention

The present invention relates generally to Ultra-Reliable and Low Latency Communications, and more particularly, to methods and apparatus of implementation for transmitting duplication data using multiple carriers in next-generation cellular communications systems, such as 5G New Radio system.

2. Description of the Prior Art

In 5G new radio (NR) technology, 3GPP RAN2 has agreed to support packet duplication in Packet Data Convergence Protocol (PDCP) sublayer for Ultra-Reliable and Low Latency Communications (URLLC) application. It is also agreed that for DL and UL, duplication solution for carrier aggregation (CA) case uses PDCP duplication to more than 1 logical channel, such that the duplicated PDCP protocol data units (PDUs) are sent over different carriers. However, it is unknown how to achieve packet transmission by using more than one logical channel.

SUMMARY OF THE INVENTION

Therefore, it is one objective of the present invention to provide methods and apparatus for transmitting duplicated PDCP PDUs in a medium access control (MAC) sublayer. Specifically, the method and apparatus of the present invention transmits the data and the duplicated data on different carriers, thereby to achieve the ultra-reliable communications.

According to one embodiment, a method for a use equipment to transmit duplication data using multiple carriers is provided. The method comprises: configured by a base station to associate a first radio bearer to at least a first logical channel and a second logical channel; associating the first logical channel to at least one first carrier; associating the second logical channel to at least one second carrier that is different from the first carrier; and transmitting a first data associated with the first radio bearer via the first logical channel and a duplicate of the first data via the second logical channel.

According to one embodiment, a user equipment (UE) is provided. The UE comprises: a storage unit arranged to store a program code; a processing circuit arranged to execute the program code thereby to perform steps of: configured by a base station to associate a first radio bearer to at least a first logical channel and a second logical channel; associating the first logical channel to at least one first carrier; and associating the second logical channel to at least one second carrier that is different from the first carrier; and a communication interfacing unit arranged to transmit a first data associated with the first radio bearer via the first logical channel and a duplicate of the first data via the second logical channel.

According to one embodiment, a base station is provided. The base station comprises: a storage unit arranged to store a program code; a processing circuit arranged to execute the program code thereby to perform steps of: associating a first radio bearer to at least a first logical channel and a second logical channel; associating the first logical channel to at least one first carrier; and associating the second logical channel to at least one second carrier that is different from the first carrier; and a communication interfacing unit arranged to transmit a first data via associated with the first radio bearer the first logical channel and a duplicate of the first data via the second logical channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
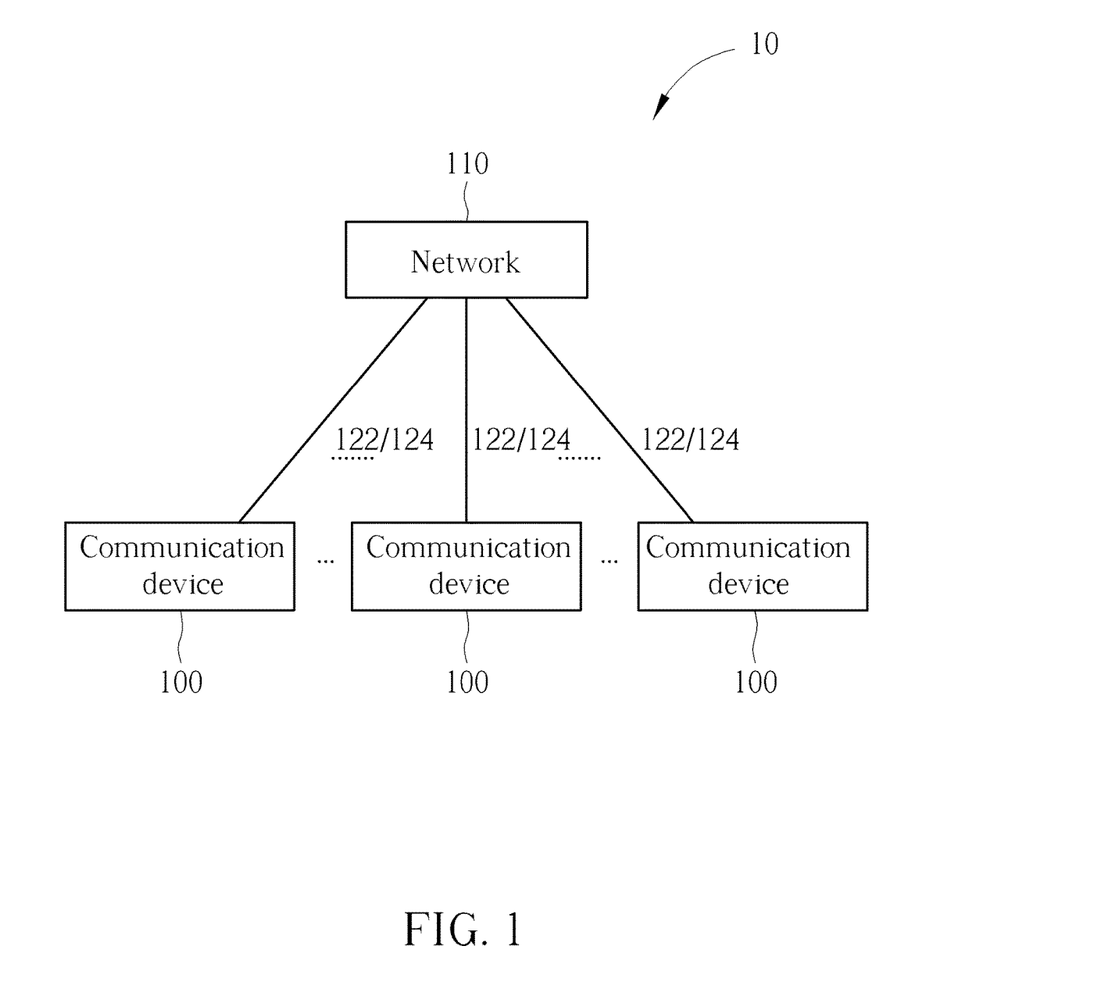
FIG. 1 is a schematic diagram of a wireless communication system according to an embodiment of the present invention.

FIG. 1 is a schematic diagram of a wireless communication system 10 according to an example of the present invention. The communication system 10 is briefly composed of a communication device 100 and a network 110. The network 110 and the communication device 100 may communicate with each other via a communication channel 120 including at least one downlink (DL) channel 122 and/or at least one uplink (UL) channel 124. In FIG. 1, the communication device 100 and the network 110 are simply utilized for illustrating the structure of the communication system 10. Practically, the network 110 may be an evolved UTRAN (E-UTRAN) including at least one evolved NB (eNB) in a long term evolution (LTE) system, an evolution of the LTE system, or a fifth generation (5G) system employing orthogonal frequency-division multiplexing (OFDM) and/or non-OFDM for communicating with the communication device 100. The 5G system enables communication in a wider system bandwidth (e.g., 100 MHz) and a short transmission time interval (TTI) shorter than 1 ms. The communication device 100 may aggregate multiple component carriers (CCs) in a time division duplex (TDD) mode and/or a frequency division duplex (FDD) mode for communicating with the network 110 in the same frequency band or different frequency bands when supporting carrier aggregation (CA) or dual connectivity (DC). A cell may be configured with a UL CC and a DL CC. If the cell is a FDD cell, the UL and DL CCs have different physical frequencies (e.g., carrier frequencies). If the cell is a TDD cell, the UL and DL CCs are the same CC. The communication device 100 may be a user equipment (UE), a mobile phone, a laptop, a tablet computer, an electronic book, a portable computer system, a vehicle or an airplane. For UL, the communication device 100 is a transmitter and the network 110 is a receiver, and for DL, the network 110 is the transmitter and the communication device 100 is the receiver.

Figure 2:
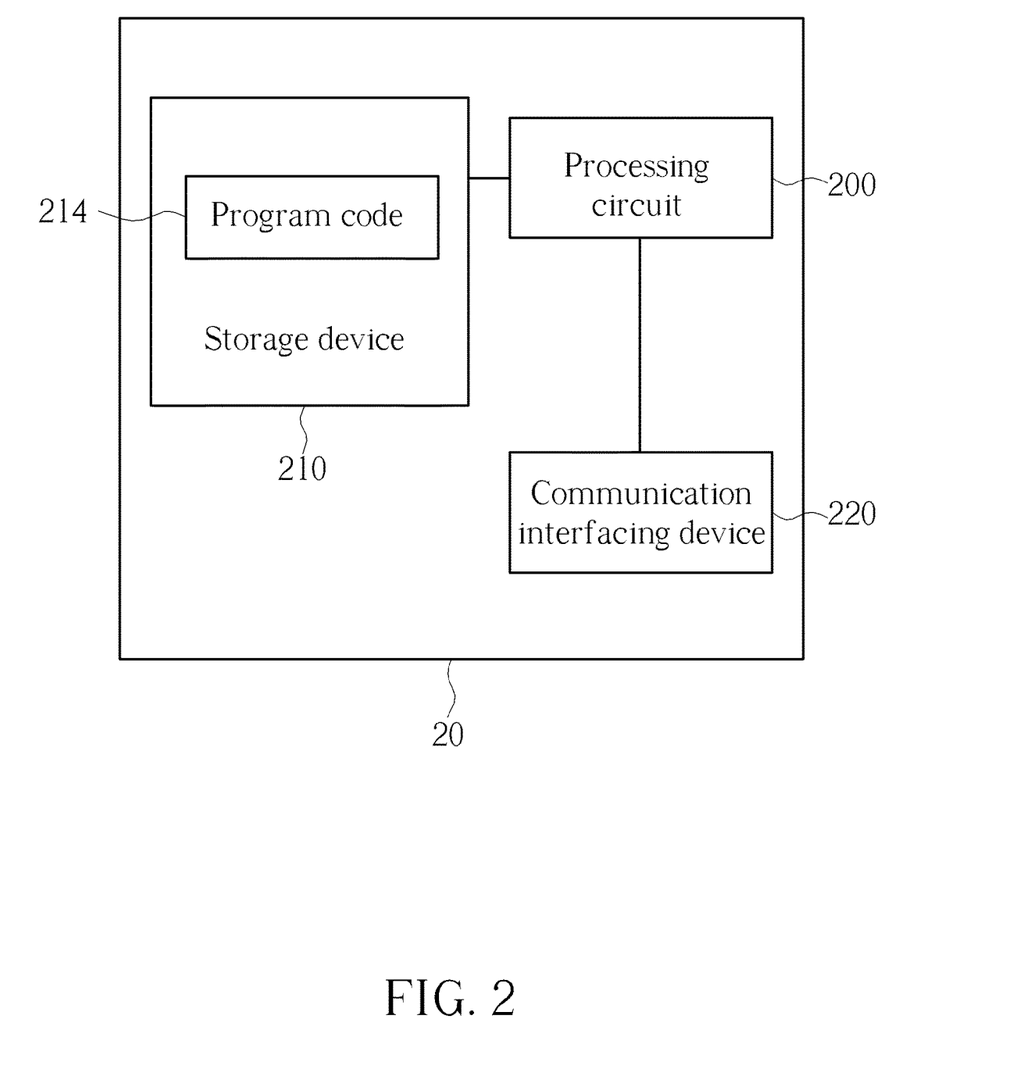
FIG. 2 is a schematic diagram of a communication device according to an embodiment of the present invention.

FIG. 2 is a schematic diagram of a communication device 20 according to an example of the present invention. The communication device 20 may be the communication device 100 or the network 110 shown in FIG. 1, but is not limited herein. The communication device 20 may include a processing means (or circuit) 200 such as a microprocessor or Application Specific Integrated Circuit (ASIC), a storage unit 210 and a communication interfacing unit 220. The storage unit 210 may be any data storage device that stores a program code 214, accessed and executed by the processing circuit 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

Transmission of Duplication Data on UE

A base station (BS) configures a UE with a first radio bearer (RB) associated to a first logical channel and a second logical channel. The UE has first data associated to the first RB to be transmitted via the first logical channel and generates a duplicate of the first data to be transmitted via the second logical channel, wherein the first data and the duplicate of the first data are data from an Ultra-Reliable and Low Latency Communications (URLLC) application.

Figure 3:
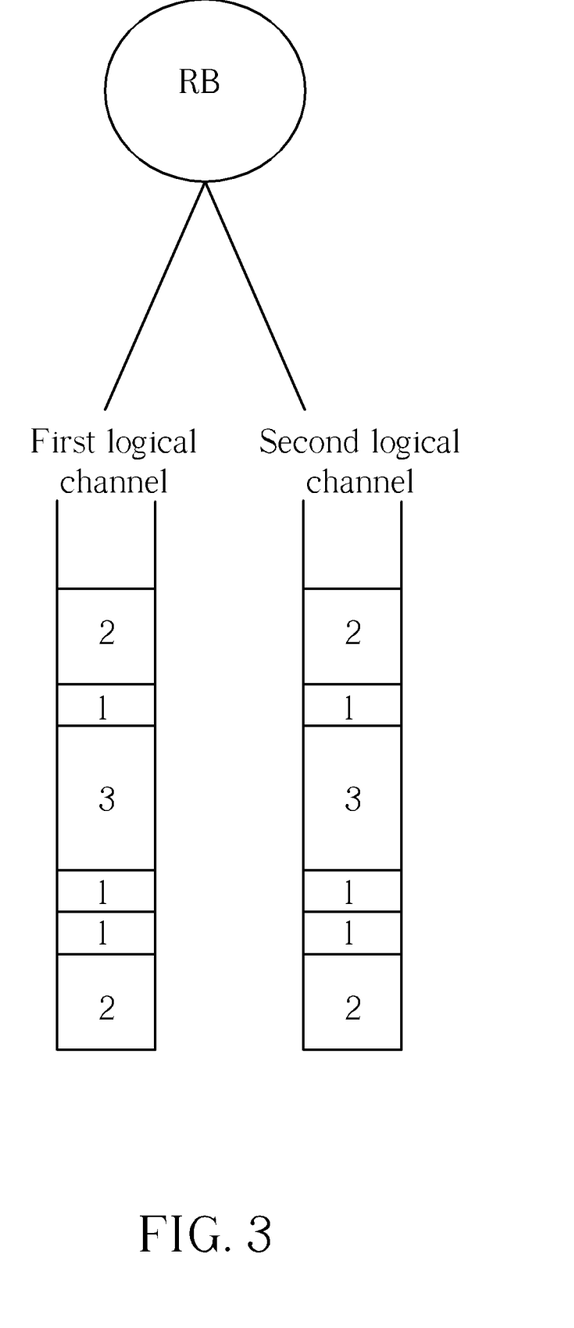
FIG. 3 is an exemplary diagram showing a configuration of a logical channel and a duplicated logical channel.

FIG. 3 is an exemplary diagram showing the above-mentioned configuration. When the UE receives a first uplink grant for transmission on a first carrier from the BS, the UE generates a first MAC PDU according to a transport block size configured by the first uplink grant. The UE includes either the first data or the duplicate in the first MAC PDU. The UE transmits the first MAC PDU to the BS. The UE may or may not include data from a logical channel associated to a second RB in the first MAC PDU. After the UE includes the first data in the first MAC PDU, if there is remaining space in the first MAC PDU, the UE may include a second data from a logical channel associated to the second RB in the first MAC PDU. That is, the UE prioritizes data from either the first logical channel or the second logical channel higher over data from the logical channel associated to the second RB.

In one embodiment, once the UE includes the first data from the first logical channel into a first MAC PDU, the UE does not include the duplicate of the first data transmitted from the second logical channel into the first MAC PDU. Then, when the UE receives a second uplink grant for uplink transmission on a second carrier from the BS, the UE generates a second MAC PDU for transmission. The UE includes the duplicate of the first data in the second MAC PDU and transmits the duplicate to the BS.

In one embodiment, once the UE includes a duplicate of a data from the second logical channel into the first MAC PDU, the UE does not include the data from the first logical channel into the first MAC PDU. Then, when the UE receives a second uplink grant for uplink transmission on a second carrier from the BS, the UE generates a second MAC PDU for transmission. The UE accordingly includes the data from the first logical channel into the second MAC PDU and transmits the second MAC PDU to the BS.

Figure 4:
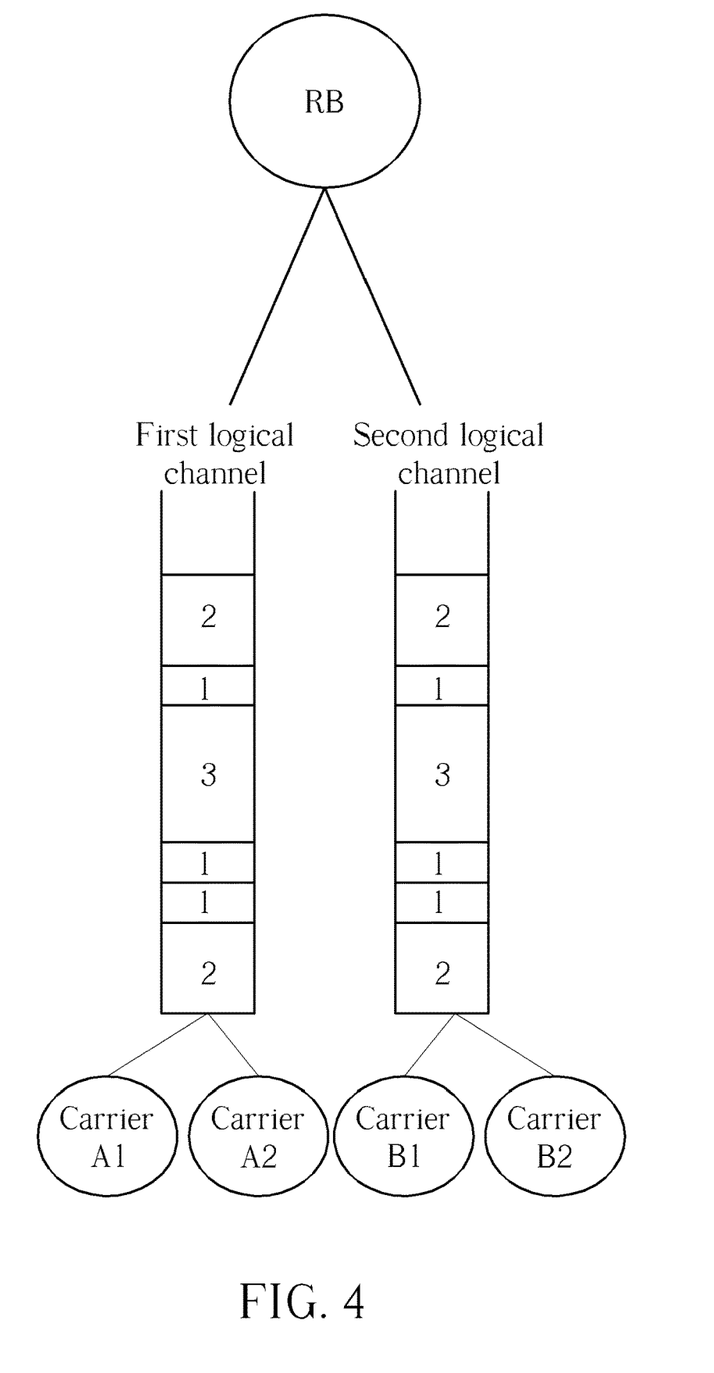
FIG. 4 is an exemplary diagram showing association of a logical channel and a duplicated logical channel with multiple carriers.

In one embodiment, the gNB configures the UE to associate the first logical channel and the second logical channel to a first plural of carriers (i.e., carriers A1-A2) and a second plurality of carriers (i.e., carriers B1-B2). The data from the first logical channel and the second logical channel can be transmitted only on the first plurality of carriers (i.e., carriers A1-A2) and the second plurality of carriers (i.e., carriers B1-B2), respectively, as shown in FIG. 4. The first plurality of carriers and the second plurality of carriers do not share a common carrier. In other word, there is no carrier that belongs to both the first plurality of carriers and the second plurality of carriers (which means the carriers A1-A2 are different from the carriers B1-B2).

Please note that the number of the carriers associated with the first and the second logical channels in FIG. 4 is not a limitation in scope of the present invention. According to various embodiments of the present invention, each of the first logical channel and the second logical channel may be associated with more than two carriers.

Figure 5:
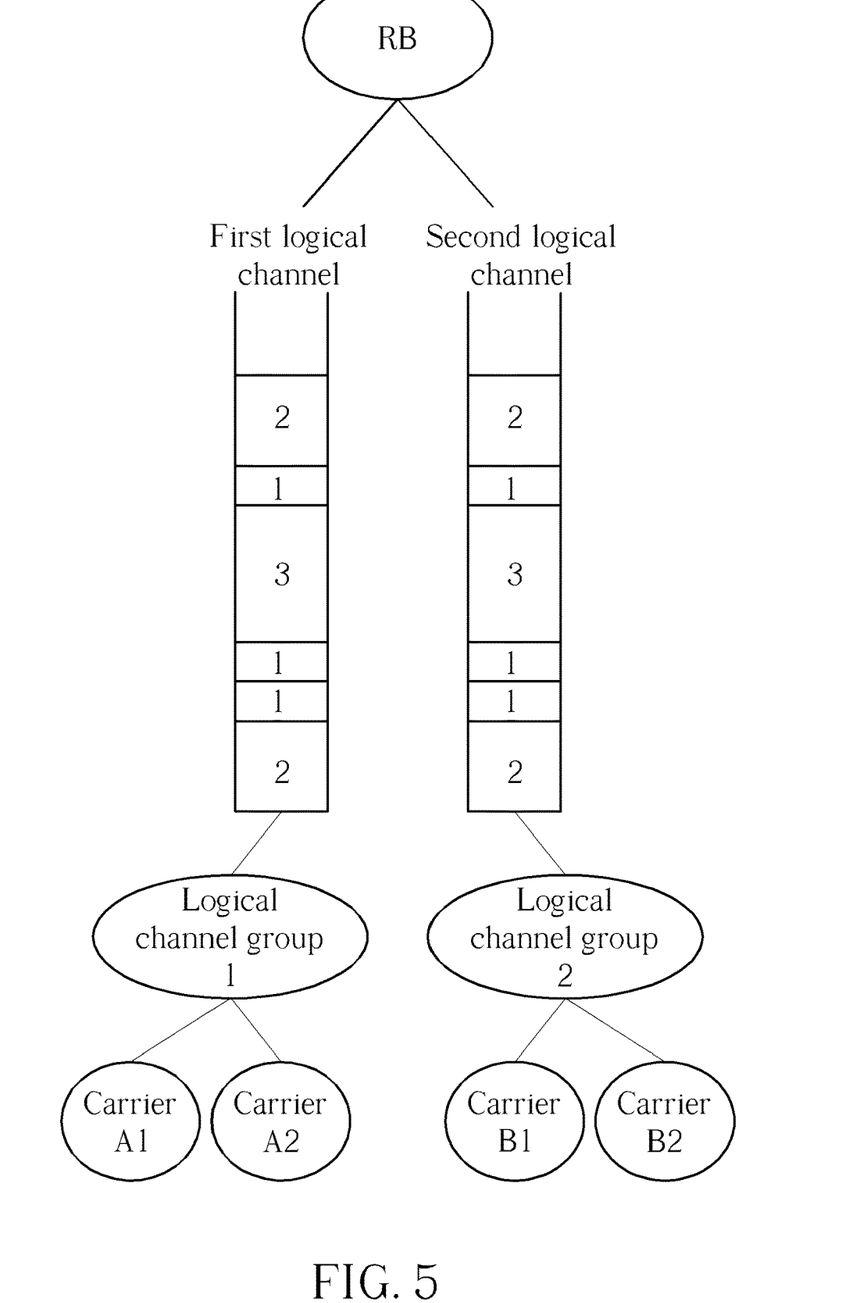
FIG. 5 is an exemplary diagram showing association of a logical channel group and a duplicated logical channel group with multiple carriers with multiple carriers.

In one embodiment, the first logical channel and the second logical channel are configured to be in the first logical channel group and the second logical channel group, respectively. The first logical channel group and the second logical channel group are associated with a first plurality of carriers (i.e., carriers A1-A2) and a second plurality of carriers (i.e., carriers B1-B2), respectively. If the UE reports buffer status for the first logical channel group, the gNB can transmit an uplink grant to the UE to make the UE transmit on one of the first plurality of carriers. The above embodiment is illustrated in FIG. 5. Furthermore, a third logical channel that is associated with the carriers A1-A2 may be configured in the first logical channel group while a fourth logical channel that is associated with the carriers B1-B2 may be configured in the second logical channel group, wherein the third logical channel and the fourth logical channel are associated with a second radio bearer.

In one embodiment, a logical channel ID is reserved to identify a MAC control element which is used to report buffer status for the first and/or second logical channel group.

In one embodiment, the gNB can transmit a MAC control element to the UE to add or remove a carrier from the first or second plurality of carriers. The MAC control element contains the logical channel group ID and a carrier ID to be removed or added.

In one embodiment, the gNB can transmit a MAC control element to the UE to change the association between a logical channel and a carrier. The MAC control element contains the logical channel ID and a carrier ID.

In one embodiment, wherein a priority of the first logical channel and a priority of the second logical channel are higher than a priority of the logical channel associated to the second RB. The UE may perform a logical channel prioritization to prioritize either the first data or the duplicate higher than the second data according the priorities of either the first logical channel or the second logical channel and the logical channel associated to the second RB.

Transmission Duplication Data on BS

A base station (BS) associates a first radio bearer with a first logical channel and a second logical channel. The BS configures the first RB, the first logical channel and second logical channel to the UE. The BS has first data associated to the first RB to be transmitted via the first logical channel and generates a duplicate of the first data to be transmitted via the second logical channel, wherein the first data and the duplicate of the first data are data from an Ultra-Reliable and Low Latency Communications (URLLC) application FIG. 3 is an exemplary diagram showing the above-mentioned configuration. The BS generates a first MAC PDU to be transmitted on a first carrier. The BS includes either the first data or the duplicate of the first data in the first MAC PDU. The BS transmits the first MAC PDU to the UE. After the BS includes the first data in the first MAC PDU, if there is remaining space in the first MAC PDU the UE may include second data from the first logical channel in the first MAC PDU. That is, the BS prioritizes data from either the first logical channel or the second logical channel higher over data from the logical channel associated to the second RB.

In one embodiment, once the BS includes the first data from the first logical channel in the first MAC PDU, the BS does not include the duplicate of the first data from the second logical channel into the first MAC PDU. Instead, the BS includes the duplicate of the first data into a second MAC PDU and transmits the second MAC PDU to the UE on a second carrier.

In one embodiment, once the BS includes the duplicate of the first data from the second logical channel into the first MAC PDU, the BS does not include the first data from the first logical channel into the first MAC PDU. The BS includes the first data from the first logical channel in a second MAC PDU and transmits the second MAC PDU on a second carrier to the UE.

In one embodiment, wherein a priority of the first logical channel and a priority of the second logical channel are higher than a priority of the logical channel associated to the second RB.

In one embodiment, the BS configures to associate the first logical channel and the second logical channel to a first plurality of carriers (i.e., carrier A1-A2) and a second plurality of carriers (i.e., carrier B1-B2). The data from the first logical channel and the second logical channel can be transmitted only on the first plurality of carriers (i.e., carrier A1-A2) and the second plurality of carriers (i.e., carrier B1-B2), respectively as shown in FIG. 4. Additionally, the first plurality of carriers and the second plurality of carriers do not share a common carrier. In other word, there is no carrier that belongs to both the first plurality of carriers and the second plurality of carriers (which means the carriers A1-A2 are different from the carriers B1-B2).

Please note that the number of the carriers associated with the first and the second logical channels in FIG. 4 is not a limitation in scope of the present invention. According to various embodiments of the present invention, each of the first logical channel and the second logical channel may be associated with more than two carriers.

In one embodiment, the first logical channel and the second logical channel are configured to be in the first logical channel group and the second logical channel group, respectively. The first logical channel group and the second logical channel group are associated with a first plurality of carriers A1-A2 and a second plurality of carriers B1-B2, respectively, as illustrated in FIG. 5. If the BS has data from the first logical channel to send to the UE, the BS transmits the data on a carrier of the first plurality of carriers to the UE. Furthermore, a third logical channel that is associated with the carriers A1-A2 may be configured in the first logical channel group while a fourth logical channel that is associated with the carriers B1-B2 may be configured in the second logical channel group, wherein the third logical channel and the fourth logical channel are associated with a second radio bearer.

In conclusion, the present invention provides methods and apparatus how to transmit duplication data in a MAC layer. That is, the data and its duplication are received through different logical channels and included into different MAC PDUs. The generated MAC PDU of the data and its duplication are respectively transmitted on different carriers, thereby to improve the reliability.

Reference throughout this specification to "one embodiment", or "an example" means that a particular feature, structure or characteristic described in connection with the embodiment or example is included in at least one embodiment of the present embodiments. Thus, appearances of the phrases "in one embodiment", "in an embodiment" "or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Additionally, any examples or illustrations given herein are not to be regarded in anyway as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a user equipment to transmit duplication data using multiple carriers, comprising:
configured by a base station to associate a first radio bearer and a second radio bearer to a first logical channel group and a second logical channel group;
associating the first logical channel group to a plurality of first carriers, comprising:
associating a first logical channel in the first logical channel group to the plurality of first carriers including at least one first carrier;
associating a third logical channel in the first logical channel group to the plurality of first carriers;
associating the second logical channel group to a plurality of second carriers, wherein the plurality of first carriers and the plurality of second carriers do not share a common carrier, comprising:
associating the second logical channel in the second logical channel group to the plurality of second carriers including at least one second carrier;
associating a fourth logical channel in the second logical channel group to the plurality of second carriers; and
transmitting a first data associated with the first radio bearer via the first logical channel and a duplicate of the first data via the second logical channel;
wherein the first logical channel and the second logical channel are associated with the first radio bearer the third logical channel and the fourth logical channel are associated with the second radio bearer.

2. The method of claim 1, further comprising:
including the first data received from the first logical channel into a first media access control (MAC) protocol data unit (PDU) and transmitting the first MAC PDU on the first carrier when receiving a first uplink grant; and
including a duplicate of the first data received from the second logical channel into a second MAC PDU and transmitting the second MAC PDU on the second carrier when receiving a second uplink grant.

3. The method of claim 1, wherein the first data and the duplicate of the first data are data from a Ultra-Reliable and Low Latency Communications (URLLC) application.

4. A user equipment (UE), comprising:
a storage unit, arranged to store a program code;
a processing circuit, arranged to execute the program code thereby to perform steps of:
configured by a base station to associate a first radio bearer and a second radio bearer to a first logical channel group and a second logical channel group;
associating the first logical channel group to a plurality of first carriers, comprising:
associating a first logical channel in the first logical channel group to the plurality of first carriers including at least one first carrier; and
associating a third logical channel in the first logical channel group to the plurality of first carriers;
associating the second logical channel group to a plurality of second carriers, wherein the plurality of first carriers and the plurality of second carriers do not share a common carrier, comprising:
associating the second logical channel in the second logical channel group to the plurality of second carriers including at least one second carrier; and
associating a fourth logical channel in the second logical channel group to the plurality of second carriers, wherein the first logical channel and the second logical channel are associated with the first radio bearer the third logical channel and the fourth logical channel are associated with the second radio bearer; and
a communication interfacing unit, arranged to transmit a first data associated with the first radio bearer via the first logical channel and a duplicate of the first data via the second logical channel.

5. The UE of claim 4, wherein the processing circuit is arranged to execute the program code thereby to further perform steps of:
including the first data received from the first logical channel into a first MAC PDU when receiving a first uplink grant;
including a duplicate of the first data received from the second logical channel into a second MAC PDU when receiving a second uplink grant;
and the communication interfacing unit is arranged to:
transmit the first MAC PDU on the first carrier and transmit the second MAC PDU on the second carrier.

6. The UE of claim 5, wherein the first data and the duplicate of the first data are data from a Ultra-Reliable and Low Latency Communications (URLLC) application executed by the processing circuit.

7. A base station, comprising:
a storage unit, arranged to store a program code;
a processing circuit, arranged to execute the program code thereby to perform steps of:
associating a first radio bearer and a second radio bearer to a first logical channel group and a second logical channel group;
associating the first logical channel group to a plurality of first carriers, comprising:
associating a first logical channel in the first logical channel group to the plurality of first carriers including at least one first carrier; and
associating a third logical channel in the first logical channel group to the plurality of first carriers;
associating the second logical channel group to a plurality of second carriers, wherein the plurality of first carriers and the plurality of second carriers do not share a common carrier, comprising:
associating the second logical channel in the second logical channel group to the plurality of second carriers including at least one second carrier; and
associating a fourth logical channel in the second logical channel group to the plurality of second carriers, wherein the first logical channel and the second logical channel are associated with the first radio bearer the third logical channel and the fourth logical channel are associated with the second radio bearer; and
a communication interfacing unit, arranged to transmit a first data associated with the first radio bearer via the first logical channel and a duplicate of the first data via the second logical channel.

8. The base station of claim 7, wherein the processing circuit is arranged to execute the program code thereby to further perform steps of:
including the first data received from the first logical channel into a first MAC PDU and including a duplicate of the first data received from the second logical channel into a second MAC PDU; and
the communication interfacing unit is arranged to transmit the first MAC PDU on the first carrier and transmit the second MAC PDU on the second carrier.

* * * * *